United States Patent
Crafton et al.

(10) Patent No.: US 7,841,457 B2
(45) Date of Patent: Nov. 30, 2010

(54) CENTRIFUGE AND VENTING SYSTEM FOR A TRANSMISSION

(75) Inventors: Drew A. Crafton, Mooresville, IN (US); Charles F. Long, Pittsboro, IN (US); Randall S. Conn, Indianapolis, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 666 days.

(21) Appl. No.: 11/770,153

(22) Filed: Jun. 28, 2007

(65) Prior Publication Data

US 2009/0000670 A1  Jan. 1, 2009

(51) Int. Cl.
- *F01M 11/08* (2006.01)
- *B01D 19/00* (2006.01)
- *F16D 25/12* (2006.01)

(52) U.S. Cl. .......... 192/48.619; 55/409; 184/6.23; 192/85.29; 192/85.41

(58) Field of Classification Search .......... 184/6.23; 55/409; 96/177
See application file for complete search history.

(56) References Cited

U.S. PATENT DOCUMENTS

| | | | | |
|---|---|---|---|---|
| 5,281,190 A | * | 1/1994 | Koivunen | 192/85 AA |
| 5,651,288 A | * | 7/1997 | Meeusen | 192/85 AA |
| 6,033,450 A | * | 3/2000 | Krul et al. | 55/409 |
| 7,547,185 B2 | * | 6/2009 | Giesler et al. | 184/6.23 |
| 2006/0016660 A1 | * | 1/2006 | Portell et al. | 192/85 AA |
| 2007/0000730 A1 | * | 1/2007 | Regonini | 184/6.23 |
| 2008/0223685 A1 | * | 9/2008 | Raszkowski et al. | 192/106 F |

FOREIGN PATENT DOCUMENTS

EP  1 344 559 A1 *  9/2003

* cited by examiner

*Primary Examiner*—Rodney H Bonck

(57) ABSTRACT

A transmission having a shaft driven by a prime mover such as an engine or motor is provided. The transmission includes a first stationary element for supporting the shaft for rotation, and a torque transmitting device connectable to the shaft and rotatable about an axis. The torque transmitting device is actuated by a hydraulic fluid. A first passage is connected to the torque transmitting device and is in communication with the hydraulic fluid. The first passage extends radially inward from the torque transmitting device. A vent passage is located within the first stationary element and is in communication with the first passage. Rotation of the torque transmitting device about the axis separates entrained air from the fluid and urges air radially inward through the first passage and into the vent passage, thereby removing air from the hydraulic fluid and circuit.

19 Claims, 1 Drawing Sheet

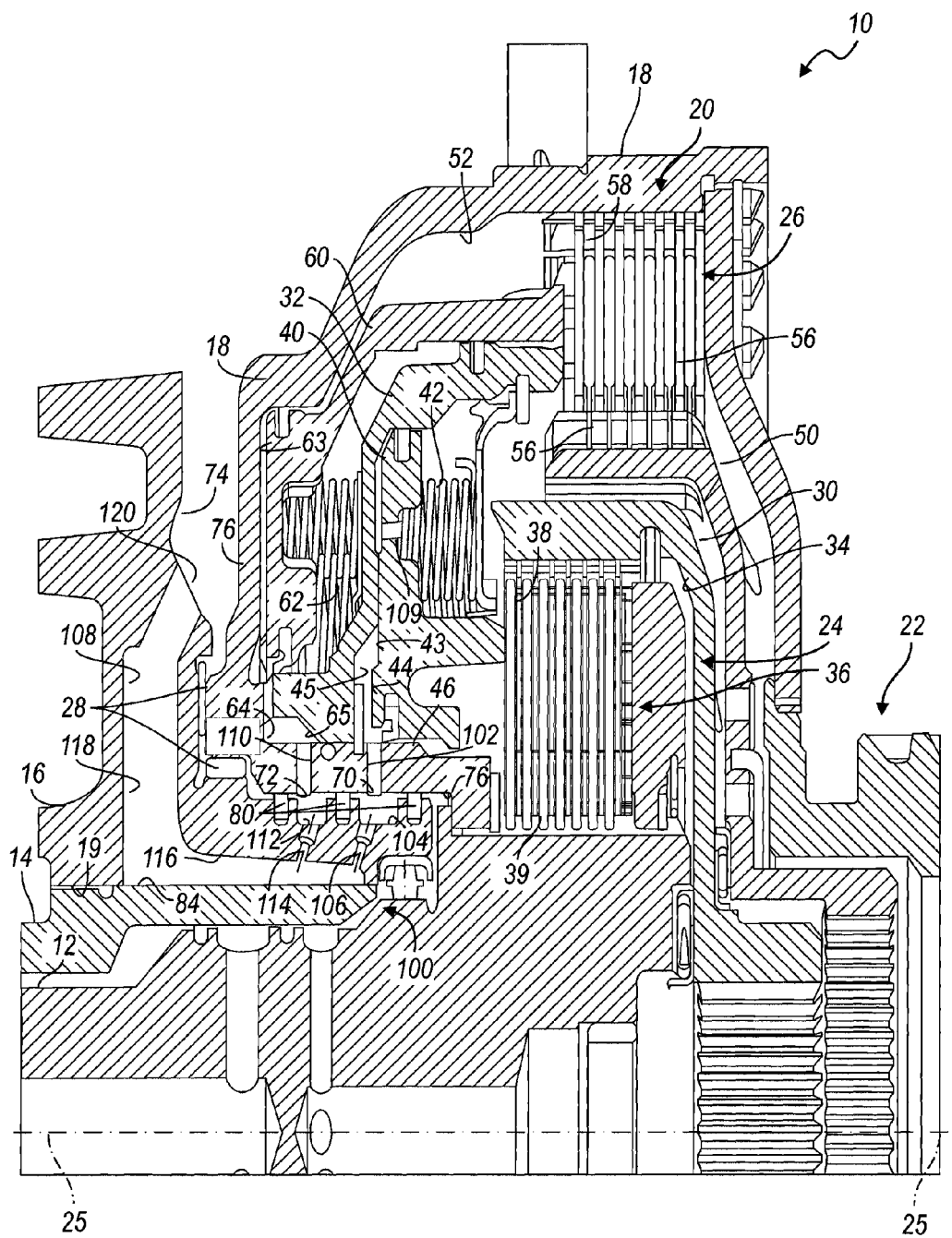

CENTRIFUGE AND VENTING SYSTEM FOR A TRANSMISSION

FIELD

The present disclosure relates to transmissions, and more particularly to a centrifuge and venting system for a transmission.

BACKGROUND

The statements in this section merely provide background information related to the present disclosure and may or may not constitute prior art.

Automatic transmissions typically include a hydraulic circuit or system that uses a hydraulic fluid, such as oil, for various purposes throughout the transmission. For example, the hydraulic system directs oil to various transmission components to act as lubrication between moving components, to act as a cooling system for dissipating waste heat, and to act as a hydraulic control system for actuating various devices. One typical device that is hydraulically actuated in an automatic transmission is known as a rotating clutch. Rotating clutches are located within a rotating portion of the transmission and are employed to selectively transmit torque when hydraulically actuated. Rotating clutches work in combination with other torque transmitting devices and with various gear sets to provide a plurality of forward and reverse gear ratios.

While the hydraulic system for providing hydraulic fluid to the components of the transmission is useful for its intended purpose, it is possible that the hydraulic fluid can entrain air during operation of the transmission or that air has accumulated within the hydraulic circuit when the transmission has not been operating. The aeration of the hydraulic fluid may occur at various locations within the hydraulic circuit, such as when the hydraulic fluid is pumped from a sump where the hydraulic fluid is stored. Entrained or trapped air within the hydraulic fluid can have several negative effects within the transmission. For example, entrained or trapped air can reduce the ability of the hydraulic system to dissipate waste heat and thereby reduce the efficiency of the cooling system within the transmission. Additionally, entrained or trapped air that builds up within a rotating clutch can affect the timing of hydraulically actuating the clutch. Mistiming of a clutching event can in turn lead to engine runaway or flare.

Various methods have been employed in an attempt to address and mitigate the negative effects of entrained air present in the hydraulic fluid. For example, bleed holes have been employed in rotating elements to attempt to bleed the trapped air and air buildup from the hydraulic circuit. Additionally, various control strategies have been employed to engage the clutches at appropriate times in order to pressurize the circuit in order to purge the accumulated buildup of air. While these methods are marginally useful for their intended purpose, there is room in the art for a system of removing the entrained air from the hydraulic fluid in an automatic transmission.

SUMMARY

The present invention provides a transmission having a shaft driven by a prime mover such as an internal combustion engine, electric machine, or turbine. The transmission includes a first stationary element for supporting the shaft for rotation, and a torque transmitting device connectable to the shaft and rotatable about an axis. The torque transmitting device is actuated by a hydraulic fluid. A first passage is connected to the torque transmitting device and is in communication with the hydraulic fluid. The first passage extends radially inward from the torque transmitting device. A vent passage is located within the first stationary element and is in communication with the first passage. Rotation of the torque transmitting device about the axis forces the denser oil outward and thereby urges the less dense air radially inward through the first passage and ultimately into the transmission case via the vent passage, thereby removing air from the hydraulic fluid.

In one aspect of the present invention, the transmission includes a housing enclosing the torque transmitting device, and the housing is rotatable about the axis.

In another aspect of the present invention, the first passage extends through the housing from an inner surface of the housing to an outer surface of the housing.

In another aspect of the present invention, the vent passage communicates with the first passage through a second passage, and the second passage is located in the first stationary element and extends radially inward from the torque transmitting device.

In another aspect of the present invention, the vent passage includes an axially extending portion connected to the second passage and a radially extending portion.

In another aspect of the present invention, the axially extending portion is defined by the first stationary element and a second stationary element.

In another aspect of the present invention, the second stationary element is a sleeve that supports the shaft.

In another aspect of the present invention, the radially extending portion connects with a vent port located on a surface of the first stationary element.

In another aspect of the present invention, the transmission further includes a second torque transmitting device located within the housing that is rotatable about the axis and actuated by a hydraulic fluid and a third passage connected to the torque transmitting device and in communication with the hydraulic fluid, wherein the third passage extends radially inward from the torque transmitting device and communicates with the vent passage.

In another aspect of the present invention, the third passage extends through the housing from the inner surface of the housing to the outer surface of the housing.

In another aspect of the present invention, the vent passage communicates with the third passage through a fourth passage, and the fourth passage is located in the first stationary element and extends radially inward from the torque transmitting device.

In another aspect of the present invention, the fourth passage connects with the vent passage at the radially extending portion of the vent passage.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

The single figure is a cross-sectional view of a portion of an exemplary automatic transmission assembly having a centrifuge and venting system according to the principles of the present invention.

DETAILED DESCRIPTION

The following description is merely exemplary in nature and is not intended to limit the present disclosure, application, or uses.

With reference to the single figure, a portion of an exemplary automatic transmission assembly for use in a motor vehicle is illustrated and generally indicated by reference number 10. The transmission assembly 10 includes a shaft assembly 12 coupled to and driven by an engine (not shown). A sleeve 14 at least partially supports the shaft assembly 12 for rotation. A stationary element or front support 16 connected to a frame (not shown) of the motor vehicle defines a bore 19 for supporting the sleeve 14 and the shaft assembly 12. Both the sleeve 14 and the front support 16 are fixed from rotation relative to the motor vehicle.

The transmission assembly further includes a housing assembly 18 that encloses a plurality of torque transmitting devices 20 and includes a plurality of gear sets 22. In the particular example provided, the plurality of torque transmitting devices 20 include a first rotating clutch 24 and a second rotating clutch 26, though it should be appreciated that any number of clutches or brakes may be employed without departing from the scope of the present invention. Likewise, while only a portion of a planetary gear set is shown, it should be appreciated that the plurality of gear sets 22 may include any number of gear sets of various kinds, including simple or compound planetary gear sets. The plurality of torque transmitting devices 20 and the plurality of gear sets 22 cooperate to provide a plurality of forward and reverse gear ratios through the transmission assembly 10. The housing assembly 18, torque transmitting devices 20, and gear sets 22 are all operable to rotate relative to the sleeve 14 and to the front support 16 about an axis, indicated by reference number 25. The housing assembly 18 is at least partially supported by the front support 16 through a plurality of bearings 28 that simultaneously support the housing assembly 18 and allow the housing assembly 18 to rotate relative to the front support 16.

As noted above, the plurality of torque transmitting devices 20 are located within the housing assembly 18 and include the first rotating clutch 24 and the second rotating clutch 26. The first rotating clutch 24 includes a hub 30 and a clutch housing 32 coupled to the housing assembly 18. The hub 30 and the clutch housing 32 cooperate to define a clutch cavity 34. The first clutch 24 includes a clutch pack 36 supported within the clutch cavity 34. The clutch pack 36 generally includes a plurality of first friction discs 38 supported on the hub 30 and a plurality of second friction discs 39 supported on the shaft assembly 12 and turning with housing assembly 18. The first and second friction discs 38, 39 are preferably intermeshed with one another. The friction discs 38, 39 may take various forms, such as intermeshed fiber faced and steel faced discs, without departing from the scope of the present invention. The clutch pack 36 is actuated by a piston 40 that operates against a biasing spring 42. The piston 40 is in turn actuated by a hydraulic fluid acting against an outer surface 43 of the piston 40 within a first operating cavity 44. The first operating cavity 44 is defined by the outer surface 43 of the piston 40, an inner surface 45 of the clutch housing 32, and an inner surface 46 of the housing assembly 18.

The second rotating clutch 26 includes a hub 50 coupled to the gear sets 22. The hub 50 and the housing assembly 18 cooperate to define a clutch cavity 52. The second clutch 26 includes a clutch pack 54 supported within the clutch cavity 52. The clutch pack 54 generally includes a plurality of first friction discs 56 supported on the hub 50 and a plurality of second friction discs 58 supported on the housing assembly 18. The first and second friction discs 56, 58 are preferably intermeshed with one another. The friction discs 56, 58 may take various forms, such as intermeshed fiber faced and steel faced discs, without departing from the scope of the present invention. The clutch pack 54 is hydraulically actuated by a piston 60 that operates against a biasing spring 62. The piston 60 is in turn actuated by a hydraulic fluid acting against an outer surface 63 of the piston 60 and the inner surface 46 of the housing assembly 18 within a second operating cavity 64. The second operating cavity 64 is defined by the outer surface 63 of the piston 60, an outer surface 65 of the clutch housing 32, and the inner surface 46 of the housing assembly 18.

A hydraulic control system (not shown) provides a hydraulic fluid, such as oil, to the first and second operating cavities 44 and 64 in order to actuate the pistons 40 and 60, respectively. More specifically, hydraulic fluid is provided through a first port 70 to the first operating cavity 44. Hydraulic fluid is also provided through a second port 72 to the second operating cavity 64. As noted above, as hydraulic fluid acts on the pistons 40, 60, the pistons 40, 60 actuate the clutch packs 36, 54 and allow torque to be transmitted through the rotating clutches 24 and 26.

A centrifuge and venting system is shown and indicated generally by reference number 100. The venting system 100 is operable to continuously remove entrained air from the hydraulic fluid within the transmission 10 during operation of the transmission 10 and to allow air that has accumulated within the hydraulic circuit when the transmission 10 is not operating to be purged out of the transmission 10 during startup (i.e. when hydraulic fluid is re-pumped into the clutches 24, 26). To this end, the venting system 100 includes a first passage 102 that extends from the first port 70 radially inward through the housing assembly 18 to a first recess 104 located in an inner surface 74 of the front support 16. The first recess 104 is enclosed by an outer surface 76 of the housing assembly 18 and by annular seals 80 that seal the front support 16 to the housing assembly 18. A second passage 106 extends from the first recess 104 to a venting passage 108 formed in the stationary front support element 16. A bleed hole 109 in the piston 40 provides a flow path for de-aerated fluid to be expelled, thereby providing for a continuous inflow of air entrained fluid into the centrifuge and venting system 100 which can then be separated and vented. The continuous de-aeration of the hydraulic fluid through the first clutch 24 not only improves the performance of the first clutch 24, but also of the second clutch 26 as both clutches 24, 26 share a common hydraulic fluid source.

The venting system 100 also includes a third passage 110 that extends from the second port 72 radially inward through the housing assembly 18 to a second recess 112 located in the inner surface 74 of the front support 16. The second recess 112 is enclosed by the outer surface 76 of the housing assembly 18 and by annular seals 80 that seal the front support 16 to the housing assembly 18. A fourth passage 114 extends from the second recess 112 to the venting passage 108 formed in the front support 16.

The venting passage 108 extends through the stationary front support element 16 and includes an axial portion 116 that extends in an axial direction and a radial portion 118 that extends in a radial direction. Accordingly, the venting passage 108 forms an essentially "L" shape. In the example provided, the radial portion 116 of the venting passage 108 is enclosed by the front support 16 and by an outer surface 84 of the sleeve 14. The venting passage 108 exits the front support 16 at a vent port 120 formed in the inner surface 74 of the front support 16. The venting passage 108 is preferably positioned such that it is proximate to the point of rotation between the rotating housing assembly 18 and the stationary elements including the front support 16 and the sleeve 14.

As noted above, as hydraulic fluid is introduced into the first operating cavity 44 in order to actuate the first clutch 24, it is possible that the hydraulic fluid may have air entrained therein. During operation of the transmission 10, the housing assembly 18 and the rotating clutches 24, 26 rotate about the axis 25. Accordingly, the first operating cavity 44 and the second operating cavity 64 rotate about the axis 25. This rotation acts as a centrifuge to separate the air from the oil such that the denser hydraulic fluid is forced radially outward and the less dense air is urged radially inward. The centrifugal action of the first rotating clutch 24 urges the air out from the first operating cavity 44, through the first passage 102 into the first recess 104. From there, the air enters the stationary second passage 106 and proceeds into the venting passage 108 which vents the air into the environment through the vent port 120. De-aerated hydraulic fluid flows through the piston bleed hole 109 and back into the hydraulic circuit. This allows the centrifuge and venting system 100 to continuously de-aerate the hydraulic fluid during operation of the transmission 10, as noted above. Similarly, in the second rotating clutch 26 air is urged out of the second operating cavity 64, through the third passage 110 into the second recess 112. From there, the air enters the stationary fourth passage 114 and proceeds into the venting passage 108 which vents the air into the environment through the vent port 120.

The centrifuge and venting system 100 bleeds air trapped in the hydraulic system when the transmission 10 has been shutdown during startup of the transmission 10 when hydraulic fluid is re-introduced to the clutches 24, 26. Additionally, as noted above, the centrifuge and venting system 100 continuously purges air from the hydraulic fluid and circuits during operation of the transmission, thereby improving shift quality through greater consistency. This feature also lowers warranty costs associated with the transmission 10 by improving the durability of the clutches by reducing wear. More specifically, the centrifuge and venting system 100 lowers the clutch heat by eliminating the need for clutch controls that engage or tie-up the clutches 24, 26 in an attempt to purge the air.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission having a shaft driven by a prime mover, the transmission comprising:
    a first stationary element for supporting the shaft for rotation, the first stationary element at least partially defining a vent passage; and
    a torque transmitting device connectable to the shaft and rotatable about an axis, the torque transmitting device having a first passage in communication with the vent passage, the first passage extending radially toward the shaft and wherein the torque transmitting device is actuatable by a hydraulic fluid, and
    wherein rotation of the torque transmitting device about the axis urges the air radially inward through the first passage and into the vent passage thereby separating the air from the hydraulic fluid.

2. The transmission of claim 1 further comprising a housing enclosing the torque transmitting device and rotatable about the axis.

3. The transmission of claim 2 wherein the first passage extends through the housing from an inner surface of the housing to an outer surface of the housing.

4. The transmission of claim 3 wherein the vent passage communicates with the first passage through a second passage, and the second passage is located in the first stationary element and extends radially inward from the torque transmitting device.

5. The transmission of claim 4 wherein the vent passage includes an axially extending portion connected to the second passage and a radially extending portion.

6. The transmission of claim 5 wherein the axially extending portion is defined by the first stationary element and a second stationary element.

7. The transmission of claim 6 wherein the second stationary element is a sleeve that supports the shaft.

8. The transmission of claim 5 wherein the radially extending portion connects with a vent port located on a surface of the first stationary element.

9. The transmission of claim 5 further comprising a second torque transmitting device located within the housing, wherein the second torque transmitting device is rotatable about the axis and is actuatable by a hydraulic fluid, the second torque transmitting device having a third passage in communication with the hydraulic fluid, wherein the third passage extends radially inward from the torque transmitting device and communicates with the vent passage.

10. The transmission of claim 9 wherein the third passage extends through the housing from the inner surface of the housing to the outer surface of the housing.

11. The transmission of claim 10 wherein the vent passage communicates with the third passage through a fourth passage, and the fourth passage is located in the first stationary element and extends radially inward from the torque transmitting device.

12. The transmission of claim 11 wherein the fourth passage connects with the vent passage at the radially extending portion of the vent passage.

13. The transmission of claim 1 further comprising a bleed hole formed through a piston in the torque transmitting device, and wherein de-aerated hydraulic fluid flows through the bleed hole to allow the air to be continuously removed from the hydraulic fluid.

14. The transmission of claim 1 wherein air is forced out of the vent passage when the hydraulic fluid is first introduced into the transmission after a shutdown.

15. The transmission of claim 14 further comprising a housing enclosing the torque transmitting device and rotatable about the axis, and wherein the first passage extends through the housing from an inner surface of the housing to an outer surface of the housing, and wherein the vent passage communicates with the first passage through a second passage, and the second passage is located in the first stationary element and extends radially inward from the torque transmitting device and wherein the vent passage includes an axially extending portion connected to the second passage and a radially extending portion.

16. The transmission of claim 15 wherein the axially extending portion is defined by the first stationary element and a second stationary element, and wherein the second stationary element is a sleeve that supports the shaft.

17. The transmission of claim 15 wherein the radially extending portion connects with a vent port located on a surface of the first stationary element.

18. The transmission of claim 15 further comprising a second torque transmitting device located within the housing, wherein the second torque transmitting device is rotatable about the axis and is actuatable by a hydraulic fluid, the second torque transmitting device having a third passage in communication with the hydraulic fluid, wherein the third passage extends radially inward from the torque transmitting device and communicates with the vent passage, and wherein the third passage extends through the housing from the inner surface of the housing to the outer surface of the housing, and wherein the vent passage communicates with the third passage through a fourth passage, and the fourth passage is located in the first stationary element and extends radially inward from the torque transmitting device, and wherein the fourth passage connects with the vent passage at the radially extending portion of the vent passage.

19. The transmission of claim 14 further comprising a bleed hole formed through a piston in the torque transmitting device, and wherein de-aerated hydraulic fluid flows through the bleed hole to allow the air to be continuously removed from the hydraulic fluid.

\* \* \* \* \*